United States Patent
De Haas et al.

(10) Patent No.: US 7,060,509 B2
(45) Date of Patent: Jun. 13, 2006

(54) METHOD FOR DEFINING REFERENCE MAGNETIZATIONS IN LAYER SYSTEMS

(75) Inventors: Oliver De Haas, Dresden (DE); Rudolf Schäfer, Dresden (DE); Claus Schneider, Dresden (DE)

(73) Assignee: Leibniz-Institut fuer Festkoerper- und Werkstoffforschung Dresden e.V., Dresden (DE)

(*) Notice: Subject to any disclaimer, the term of this patent is extended or adjusted under 35 U.S.C. 154(b) by 0 days.

(21) Appl. No.: 10/473,593

(22) PCT Filed: Apr. 5, 2002

(86) PCT No.: PCT/DE02/01302

§ 371 (c)(1),
(2), (4) Date: Oct. 10, 2003

(87) PCT Pub. No.: WO02/084680

PCT Pub. Date: Oct. 24, 2002

(65) Prior Publication Data

US 2004/0112469 A1    Jun. 17, 2004

(30) Foreign Application Priority Data

Apr. 12, 2001 (DE) ............................. 101 19 381

(51) Int. Cl.
*H01L 21/00* (2006.01)
(52) U.S. Cl. .......................................................... 438/3
(58) Field of Classification Search .................... 438/3; 324/200, 219, 260, 262; 365/158
See application file for complete search history.

(56) References Cited

U.S. PATENT DOCUMENTS 6,270,588 B1    8/2001  Takano et al.
6,727,105 B1 *  4/2004  Brug et al. ..................... 438/3

FOREIGN PATENT DOCUMENTS

JP    10-74658     3/1998
JP    11273034    10/1999

OTHER PUBLICATIONS

Database Inspec Online? Institute of electrical Engineers, Stevenage, GB, Tsunda M. Et al., "Reversible Change of Direction of the Exchange Anisotropy of Polycrystalline Ferromagnetic/Antiferromagnetic Bilayers by thermal Annealing in Magnetic Field", Database accession No. 700615, XP02212605.
Patent Abstracts of Japan. vol. 2000, No. 1, Jan. 31, 2000.
Patent Abstracts of Japan, vol. 1998, No. 08, Jun. 30, 1998.
English Language translation of Masakiyo Tsunoda et al., "A Reversible Change of Induction of The Exchange Anisotropy of Polycrystalline Ferromagnetic/Antiferromagnetic Bilayers by Thermal Annealing In Magnetic Field", Journal of the Magnetics Society Japan, 2001, Magnetics Society of Japan, vol. 25, No. 4, pt.. 2, pp. 827-830 (Apr. 15, 2001).

* cited by examiner

*Primary Examiner*—Scott Geyer
(74) *Attorney, Agent, or Firm*—Greenblum & Bernstein, P.L.C.

(57) ABSTRACT

The invention is used in the field of materials engineering and relates to a method for defining reference magnetizations which could be used, for example, in magnetic sensor technology components. The object of the present invention is to disclose a method for defining reference magnetizations in layer systems, whereby the reference directions can be selected as desired with regard to number and spatial direction. The object is attained through a method for defining reference magnetizations in layer systems in which at least one layer system is produced by geometrically structuring a hard-magnetic and/or soft-magnetic layer and by applying the hard-magnetic and/or soft magnetic layer to at least one antiferromagnetic layer before, during or after a single-stage or multi-stage thermal treatment, whereby the temperature is increased at least to a temperature greater than the coupling temperature and the layer system is cooled afterwards.

11 Claims, 2 Drawing Sheets

METHOD FOR DEFINING REFERENCE MAGNETIZATIONS IN LAYER SYSTEMS

FIELD OF APPLICATION OF THE INVENTION

The invention is used in the field of materials engineering and relates to a method for defining reference magnetizations that could be used, for example, in components used in magnetic sensor technology or spin electronics, such as, e.g., in GMR sensors or MRAM storage cells.

DESCRIPTION OF BACKGROUND INFORMATION

The use of exchange coupling between ferromagnets and antiferromagnets (AFM) or artificial antiferromagnets (AAF) to secure magnetizations in magnetic layer systems is known.

In most cases components in magnetic sensor technology or spin electronics require a fixed reference magnetization direction. To this end the magnetic coupling to a so-called "anchor layer" is frequently utilized. This anchor layer can comprise a hard magnet, a natural or artificial antiferromagnet. The magnetization direction of the ferromagnetic layer is spatially fixed through the exchange coupling between ferromagnet and anchor layer.

This anchor layer itself must likewise be magnetically aligned. To this end, depending on the material properties of the anchor layer, until now the following processes have been used:

Layer deposition in an external magnetic field
Thermal aftertreatment in an external magnetic field
Field cooling after local laser irradiation In all three cases an effective field cooling is carried out, i.e., the ferromagnet/anchor layer system is transferred from a state above the critical coupling temperature (blocking temperature $T_B$) with applied magnetic field to a coupled state. Thus a homogenous magnetization of the ferromagnetic layer forced by the magnetic field is impressed by direct exchange coupling into the spin configuration of the antiferromagnetic layer. For external field strengths below the coupling field strength, the adjusted homogenous magnetization of the ferromagnetic layer is maintained and thus serves as reference magnetization.

Of the processes listed above, only the last one is able to locally change reference magnetizations in the area of the focus of a laser beam.

The disadvantages of the known processes are that, with the exception of the laser process, it is impossible to realize several reference directions in any directions to one another at the same time. This is necessary for the functionality of more complex magnetoelectronic components, such as, e.g., angle sensors.

And finally subsequent process steps for aligning the AFM are necessary and complicated and only to a certain extent compatible with the microminiaturization.

It is further known that in soft-magnetic layer elements the magnetization is orientated along the element edges in order to avoid stray fields. The magnetic flux thus provides a closed configuration. As van den Berg discovered, the magnetization also remains parallel to the nearest element edge in the interior of the element. In points that have the same distance to two element edges, the different magnetic areas collide. A state thus arises with homogenous magnetic domains that are separated by domain walls.

It is known that elements separated from one another by a sufficiently small distance interact with one another via their stray area. In order to achieve a state that is favorable in energy terms, neighboring elements adopt magnetization configurations that are close to a closed magnetic flux and cause only small stray fields.

SUMMARY OF THE INVENTION

The object of the current invention is to disclose a method for defining reference magnetizations in layer systems, whereby the reference directions can be selected as desired with regard to number and spatial direction.

The object is attained through the invention disclosed in the present application and through the guidance disclosed herein.

With the method according to the invention for defining reference magnetizations in layer systems, at least one hard-magnetic and/or soft-magnetic layer is produced by geometrically structuring a hard-magnetic and/or soft-magnetic layer and by bringing the hard-magnetic and/or soft-magnetic layer into direct contact with at least one antiferromagnetic layer before, during or after a single-stage or multi-stage thermal treatment. The thermal treatment is thereby conducted with a temperature increase of at least up to a temperature greater than the coupling temperature. Afterwards the layer system is cooled.

Advantageously the layer system is cooled without the application of a magnetic field after the thermal treatment so that the demagnetized state or the residual state impresses itself undisturbed as a reference magnetization.

It is further advantageous to cool the layer system after the thermal treatment in an external magnetic field, in order to impress a demagnetized or residual state changed by the field as a reference magnetization.

Advantageously the layers are produced with lateral expansions in the micrometer and nanometer range and layer thicknesses in the nanometer range.

It is also advantageous if several layers with the same or different composition are heated to a temperature greater than the coupling temperature and are afterwards cooled without a magnetic field.

According to the invention the method for defining reference magnetizations is used in magnetoresistive sensor elements or magnetoresistive switching elements based on an anisotropic magnetoresistance or on a giant magnetoresistance or on a tunnel magnetoresistance or on a spin injection magnetoresistance or in active magnetoelectronic components based on a giant magnetoresistance or on a tunnel magnetoresistance or on a spin injection magnetoresistance.

With the method according to the invention, first a hard-magnetic and/or soft-magnetic layer is geometrically structured. This can occur with processes known from microelectronics, such as, e.g., lithographic processes. Through this geometric structuring, the form, number and arrangement of these geometric elements to one another are determined. This process step has a decisive influence on the magnetization direction of the hard-magnetic and/or soft-magnetic layer, since according to the principle discovered by van den Berg, the magnetization direction within the respective form is determined through the selection of the geometric form. Within a form, domains form whose magnetization is orientated parallel to the nearest edge. Alternatively, the stray field interaction of neighboring elements can be used for the formation of desired domain patterns.

Thus, through the number, form, and/or arrangement to one another, there can be produced in a layer system as many reference directions as desired and as many different reference directions as desired.

After the geometric structuring, heating to a temperature greater than the coupling temperature enables the magnetization configurations to be adjusted in the hard-magnetic and/or soft-magnetic layer that is free due to the temperature increase, corresponding to the domain elements. In the subsequent cooling without application of a magnetic field, the antiferromagnetic layer takes over the magnetization configuration of the hard-magnetic and/or soft-magnetic layer. Thus the layer system features a uniform magnetization configuration.

It is also possible according to the method of the invention for the hard-magnetic and/or soft-magnetic layer alone to be subjected to the thermal treatment and to be applied to an antiferromagnetic layer during or after the cooling. Here too the antiferromagnetic layer takes over the magnetization configuration of the hard-magnetic and/or soft-magnetic layer.

If the hard-magnetic and/or soft-magnetic layer is applied or can be applied only after the production of the antiferromagnetic layer, its structuring can be carried out, for example, by an alternating mask process or lithographically controlled ion etching.

When the antiferromagnetic layer is present during the thermal treatment, the magnetization of the antiferromagnet is determined not by an applied magnetic field, but by the magnetization of the exchange-coupled ferromagnetic layer.

According to the invention, it is also possible to apply a magnetic field during the thermal treatment. A decaying alternating magnetic field can promote the adjustment of the pattern thereby according to the description of van den Berg. A sufficiently strong constant magnetic field can bring about residual magnetization states in a targeted manner.

A further advantage of the method according to the invention is that the domain patterns of the hard-magnetic and/or soft-magnetic layer are maintained even at higher temperatures and thus the method is also compatible with the temperature treatment for the production of an antiferromagnetic state, such as, e.g., with PtMn and similar substances.

Furthermore it is advantageous that the reference magnetizations defined by the method according to the invention can be regenerated (self-healing). This can only be realized by a re-heating of the multi-layer structure above the coupling temperature. Thus destroyed magnetizations above the coupling temperature are reestablished and after cooling, can again serve as reference magnetizations.

With the miniaturization of magnetoelectronic components, the method according to the invention can readily be used, since it is applicable over a wide scaling range. A reliable defining of the reference magnetization can be achieved in particular in the submicrometer range.

BRIEF DESCRIPTION OF THE DRAWINGS

The invention is described in more detail below on the basis of several exemplary embodiments. Thereby FIG. 1 Shows a typical magnetization configuration of a ferromagnetic layer and an antiferromagnetic layer
a) before a thermal treatment
b) at $T>T_B$, where $T_B$-coupling temperature
c) after a thermal treatment (the layers are drawn separately to give a better view) and FIG. 2 Shows a Kerr microscope image of 4 ellipse-like structured elements, whereby the magnetization shows downwards in the black elements and upwards in the white elements.

DETAILED DESCRIPTION OF THE INVENTION AND EXAMPLES

EXAMPLE 1

Figure 1:
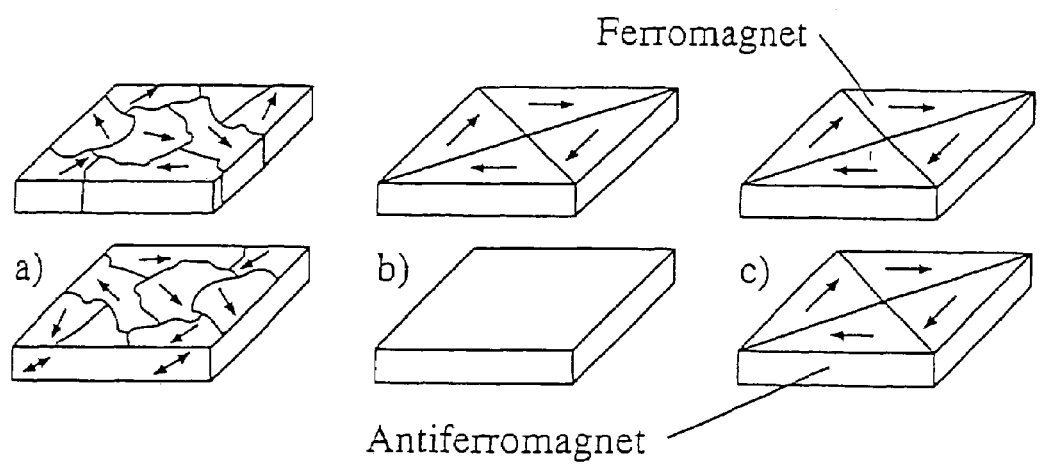

For a 360° GMR angle sensor, reference magnetizations at right angles to one another are needed. For this purpose a 10 nm-thick FeMn layer is first deposited on silicon as an anchor layer, and a 100 nm-thick ferromagnetic $Ni_{81}Fe_{19}$ layer is deposited thereon. Squares with an edge length of 24 μm are structured with the aid of lithographic techniques. The ferromagnetic layer must be completely removed outside the structure. Then the thermal treatment takes place at 200° C. When the temperature of 200° C. is reached, the sample is demagnetized in a decaying magnetic field of maximum amplitude of 1 kA/cm and then cooled to room temperature without the action of a magnetic field. The layer system now shows a stable magnetization configuration according to FIG. 1.

EXAMPLE 2

Figure 2:
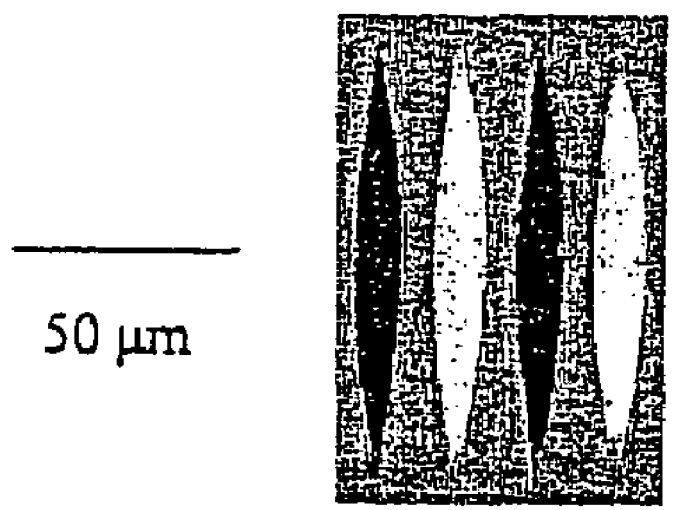

Magnetoresistive magnetic field sensors are advantageously embodied in a Wheatstone bridge circuit. In order to realize the signals of the individual elements of the Wheatstone bridge that are inverse to one another, reference magnetizations antiparallel to one another are needed. A double layer comprising 10 nm FeMn and 100 nm $Ni_{81}Fe_{19}$ is sputtered onto a silicon substrate. A homogenous magnetic field of the strength 240 A/cm is applied during the layer deposition. In the subsequent lithography step, 4 elements of an ellipse-like form with the lateral dimensions of 100 μm×20 μm are structured. The elements are orientated parallel to one another and to the field direction during the layer deposition and lie adjacent to one another at a distance of 30 μm. Now the thermal treatment takes place at 200° C. When the temperature of 200° C. is reached, the sample is demagnetized in a decaying field of maximum amplitude of 1 kA/cm orientated diagonally to the element axis and is then cooled to room temperature without the action of a magnetic field. The layer system now shows a stable magnetization configuration, as shown in FIG. 2.

The invention claimed is:

1. Method for defining reference magnetizations in at least one layer system, comprising producing at least one layer system by geometrically structuring at least one of a hard-magnetic layer or soft-magnetic layer, and applying the at least one of a hard-magnetic layer or soft-magnetic layer to at least one antiferromagnetic layer before, during or after a single-stage or multi-stage thermal treatment, the single-stage or multi-stage thermal treatment including increasing the temperature to at least a temperature greater than the coupling temperature, and afterwards cooling the layer system.

2. Method according to claim 1, wherein the layer system is cooled without applying a magnetic field.

3. Method according to claim 1, comprising cooling the layer system with an applied magnetic field, so that, depending on desired reference magnetization, a magnetization configuration of at least one of the hard-magnetic or soft-magnetic layer or the antiferromagnetic layer is changed.

4. Method according to claim 1, comprising impressing a magnetic field into the layer system.

5. Method according to claim 1, comprising producing layers with lateral dimensions in the micrometer and nanometer range and layer thicknesses in the nanometer range.

6. Method according to claim 1, comprising heating several layers with the same or different composition to a temperature greater than the coupling temperature and afterwards cooling without a magnetic field.

7. Method according to claim 1, wherein square, rectangular, triangular, circular structuring or forms derived therefrom are generated.

8. Method according to claim 1, wherein the thermal treatment is carried out until complete penetration is achieved.

9. Method according to claim 1, wherein geometric structuring is carried out two- or three-dimensionally.

10. Method according to claim 1, wherein at least one hard-magnetic or soft-magnetic layer is geometrically structured and applied to an antiferromagnetic layer, and afterwards performing a single-stage thermal treatment with cooling.

11. Method according to claim 1, wherein the at least one layer system comprises magnetoresistive sensor elements or magnetoresistive switching elements based on an anisotropic magnetoresistance or on a giant magnetoresistance or on a tunnel magnetoresistance or on a spin injection resistance or comprises active magnetoelectronic components based on a giant magnetoresistance or on a tunnel magnetoresistance or on a spin injection resistance.

* * * * *